United States Patent Office  3,623,332
Patented Nov. 30, 1971

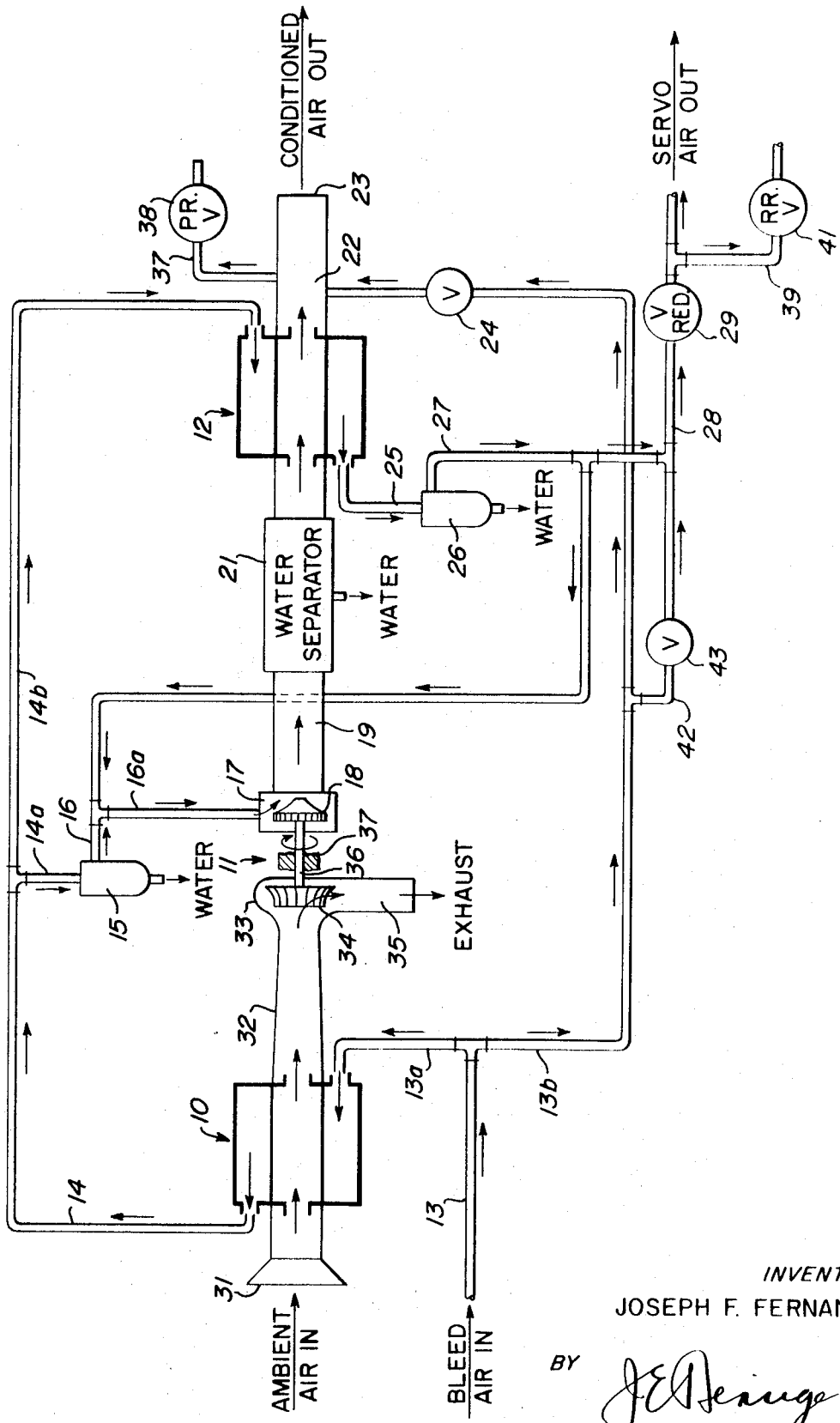

3,623,332
AIR CYCLE AIR CONDITIONING SYSTEM AND METHOD
Joseph F. Fernandes, Dayton, Ohio, assignor to United Aircraft Products, Inc., Dayton, Ohio
Filed Mar. 31, 1970, Ser. No. 24,118
Int. Cl. F25b 9/00
U.S. Cl. 62—88                                                                  5 Claims

ABSTRACT OF THE DISCLOSURE

Apparatus and method utilizing compressor bleed air and the like for environmental air conditioning and as conditioned servo fluid. An air cycle machine effects cooling and depressurizing of a portion of bleed air, directing it to a place of use for environmental cooling. Another portion of the bleed air is directed to a place of use as a pressure fluid, in by-passing relation to the air cycle machine. In a reheat heat exchanger the two portions are brought into heat transfer relation, with consequent improvement in the relative humidity characteristics of the first portion and cooling of the second portion. Pressure reducing means provides for expansion of the said second portion and corresponding improvement in relative humidity.

BACKGROUND OF THE INVENTION

This invention relates to air handling systems, and has particular though not limited reference to aircraft ground service carts.

An aircraft parked on the ground and not operating under its own power may require that its interior, or selected compartments thereof, be supplied with a conditiond air from an outside source. There may be additionally a requirement for servo air, that is, air under relatively high pressure supplied to the aircraft to perform as a pressure fluid in the operation of on-board valves and other controls. It has been known to meet these requirements using portable equipment having air compressing and air cooling capabilities. Available apparatus has been relatively complicated, however, and provides no interrelation between the cooling system and the servo system, resulting in duplication of parts. Also, it has had limited success in delivering air relatively free of moisture. Systems of the class described have exacting requirements in regard to the permitted relative humidity of delivered air, particularly when cooling or servicing instruments adversely affected by moisture. The use of air cycle machines as a source of conditioned air has been known, but this complicates the achieving of low humidity conditions. Such machines draw upon compressed air for their operation, and in bringing about reduced temperature and pressure conditions of the air emphasize humidity problems.

SUMMARY OF THE INVENTION

The present invention has in view a method of and apparatus for delivering conditioned air for space cooling or heating, and, simultaneously therewith and from the same source, delivering a relatively high pressure air for servo purposes. An air cycle machine is utilized as well as water separating and eliminating equipment so that delivered air is free of excess moisture. According to a feature of the invention, partly cooled air is used to supply the servo system and is brought into heat transfer relation to low temperature, low pressure air exiting from the air cycle machine. In a complementary operation, therefore, the servo air is reduced to an operating temperature and the main flow of air from the air cycle machine is increased in temperature while being restricted from communication with the atmosphere. Very low relative humidity conditions of the main air flow result. The servo air is controlled in temperature without reliance on added equipment, and, in a further feature, the servo air is delivered through pressure regulating means effectively decreasing the pressure thereof. Again, therefore, low relative humidity conditions prevail as the servo air expands under restricted environmental circumstances while maintaining a selected operating temperature.

An object of the invention is to provide an integrated air cycle cooling system and servo supply system offering unique advantages in the ground servicing of aircraft and in like applications.

Another object of the invention is to provide a method of achieving low relative humidity conditions in the air delivered by the foregoing integrated systems.

Other objects and structural details of the invention will appear more clearly from the following description, taken in conjunction with the accompanying drawing, which is a diagram of elements of a system incorporating the present invention.

The drawing illustrates a combination of elements, some or all of which may be involved in practice of the invention. The invention is described as applicable to ground equipment useful in servicing aircraft and it will be understood in this connection that operating equipment of this class includes controls and supplemental apparatus not here shown either because they are unnecessary to the disclosure or would unduly complicate the disclosure, or both. The diagrammed elements can advantageously be combined on a single mobile vehicle suitably drawn to a place of use and receiving the air with which it deals from an external source. The external source air will hereinafter be referred to as bleed air since it will normally be air taken from a jet type engine after compression and before combustion and accordingly has high pressure, high temperature characteristics. The term bleed air is intended, however, to identify relatively high pressure and high temperature air whatever its source. The diagrammed system, in conjunction with unillustrated components, accepts the bleed air, dissipates a part of the energy which has been put into the air by its compression and delivers it under controlled conditions of reduced pressure and temperature to a place or places of use. In a particular example, a primary flow of air is delivered to an aircraft compartment having critical temperature-humidity requirements while a secondary flow of air is made available for servo purposes.

Referring to the diagram, principal illustrated components of the system include a main heat exchanger 10, an air cycle machine 11, and a reheat heat exchanger 12. From an external source, as for example from a mobile gas turbine compressor, bleed air is admitted to the system, entering by way of an inlet duct 13. Having had energy stored therein by compression in the gas turbine compressor, the bleed air is admitted to the system at pressure and temperature values substantially higher than values at which it is desired to supply conditioned air and servo air. The high pressure, high temperature bleed air flows by way of an extension 13a of duct 13 to the main heat exchanger 10. Passing through and beyond the heat exchanger 10, the bleed air is conducted by a duct 14 and an extension 14a thereof to a water eliminator 15. Beyond water eliminator 15, the bleed air flows through a duct 16 and extension 16a thereof to the air cycle machine 11 where it is allowed to expand into a chamber 17 containing turbine means 18. Flowing to and through the nozzles and vanes of the turbine means 18, the air leaves chamber 17 and enters duct 19. Interposed in the latter is a water separator 21 and the bleed air after passing through separator 21 flows to and through the reheat heat exchanger 12.

Delivered finally to a duct 22, the bleed air emerges from the system by way of an outlet 23, the latter being suitably controlled and connected for delivery of the discharging air to a selected place of use.

The bleed air entering at duct 13 has access not only to extension 13a thereof but to an extension 13b leading directly to the outlet means 22–23 in by-passing relation to the described principal elements of the system. A valve 24 is in line 13b and controls flow therethrough. Also, the bleed air flowing beyond main heat exchanger 10 by way of duct 14 has access not only to extension 14a but to an extension 14b. The latter leads, in by-passing relation to the air cycle machine 11, directly to the reheat heat exchanger 12 where it is connected to pass what may be considered a secondary flow of air in heat transfer relation to primary air flow moving from duct 19 to outlet means 22–23 by way of heat exchanger 12. Beyond the reheat heat exchanger, the secondary air flow is conducted by a duct 25 to a water eliminator 26 and then by a duct 27 to a discharge duct 28 terminating in an outlet designated "Servo Air Out." In the duct 28 is flow control means here represented as reducing valve means 29.

The main heat exchanger 10 presents heat transfer surface on one side of which is bleed air flowing from duct 13a to duct 14. On the other side thereof is ambient air entering the system at inlet manifold means 31. Ambient air flows from manifold means 31 to and through the heat exchanger 10, discharging therefrom by way of a duct 32. The latter terminates in a volute chamber 33 in which is a bladed compressor fan 34. From volute chamber 33, the ambient air discharges to exhaust by way of an outlet duct 35.

A shaft 36, rotatable in a fixed bearing 37 connects turbine means 18 and compressor means 34 in a driving-driven relation.

In expanding into the chamber 17, the bleed air effects a rotary drive of turbine means 18 which in view of the connection afforded by shaft 36 effects a corresponding rotary drive of compressor fan means 34. Rotation of the latter in volute chamber 33 tends to depress the pressure in duct 32 and at inlet 31 with the result that ambient air moves into the system through inlet means 31, flows through the main heat exchanger 10 and is forcibly ejected by fan means 34 to exhaust. Accordingly, bleed air passing through the main heat exchanger 10 is exposed to heat transfer contact in heat exchanger 10 with flowing ambient air. The bleed air is reduced in temperature thereby to what may be considered a partly cooled condition. Depending upon involved flow rates, amount and kind of heat transfer surface and other variables, the reduction in bleed air temperature may be to a value at or approaching the ambient air temperature. The partly cooled bleed air entering chamber 17 yields up energy converted to power by the turbine means 18 which is in turn delivered to the compressor fan 34. The fan 34 provides the load for the turbine and consumes the turbine power by compressing the air in volute chamber 33 and inducing thereby a continuing flow of ambient air through the main heat exchanger.

In expanding past the turbine means 18, the bleed air is reduced in pressure and it will be understood that the air cycle machine is constructed for a dissipation of energy such that the pressure of the bleed air as reduced by passage through the machine equals the desired pressure at the place of use plus system losses downstream of the turbine means. Similarly, the extraction of energy has the effect of reducing the bleed air temperature and in this case, for reasons which will hereinafter more clearly appear, the low temperature achieved is below the desired delivered air temperature.

In the operation of the system, therefore, in-coming bleed air is partly cooled in heat exchanger 10, is reduced in pressure and further cooled in air cycle machine 11 and continues on beyond the air cycle machine by way of duct 19. Flowing through the duct to outlet means 22–23, the cooled lower pressure, air passes through reheat heat exchanger 12. There it is exposed in heat transfer relation to the secondary flow of bleed air which since it has been conducted in by-passing relation to the air cycle machine is only partly cooled and remains at an elevated pressure. Within heat exchanger 12, therefore, there is an exchange of heat between the primary and secondary air flows. The former increases in temperature and the latter decreases, with the construction and arrangement of parts again being one to raise the temperature of the primary air flow to a temperature value corresponding approximately to the desired air delivery temperature and to lower the temperature of the secondary air flow to a temperature value corresponding approximately to the desired delivery temperature of the servo air. The desired pressure value of the delivered servo air is achieved in the control means represented by reducing valve 29. Relatively high pressure secondary air discharging from heat exchanger 12 flows through ducts 25–27 to discharge duct 28 and escapes past valve means 29, effectively expanding thereby to the servo air outlet. Servo air supplied in excess of demand is by-passed internally of the system. A passage 36, for this purpose, connects duct 27 and turbine inlet duct 16a.

In the interest of avoiding excessive pressurization of the places of use of the conditioned air and of the servo air, suitable pressure relief means may be provided. As shown, outlet means 22–23 has an exhaust passage 37 leading therefrom controlled by a pressure relief valve 38. A similar passage 39 extends from servo discharge passage 28, beyond valve 29 and includes a pressure relief valve 41.

The by-passing duct 13b, in conjunction with valve 24 therein, provides a means of achieving a temperature modifying effect upon air discharging from the conditioned air outlet. Thus, when it becomes necessary or desirable to increase the temperature of the delivered conditioned air, valve 24 is opened to a greater or lesser extent, allowing a by-pass flow of bleed air directly from inlet duct 13 to the conditioned air outlet 22–23. The valve 24 may operate under suitable automatic controls to establish and maintain a desired high outlet air temperature.

In order that a similar end may be achieved with respect to the delivery of servo air, the duct 13b includes a branch passage 42 connecting duct 13b to servo air discharge duct 28. A valve 43 in the passage 42 suitably controls the introduction of hot air into the delivered servo air.

The bleed air supplied to the system, having been compressed from the atmosphere, contains moisture in amounts inconsistent with requirements for delivery of a cool, relatively dry air. The water eliminators 15 and 26 and the water separator 21 function to remove large amounts of entrained moisture from the bleed air. They may assume any convenient structural form suited for liquid-gas separation. The moisture laden air entering the removal devices separates into liquid and gas components with the former discharging as indicated in the form of water and the latter being directed in the manner described through communicating air flow passages.

The instant invention affords a further refinement in that in addition to the de-watering accomplished in devices 15, 21 and 26 other means operate to improve the relative humidity characteristics of the delivered air. Thus, in the case of the primary air flow the temperature produced by passage through the air cycle machine is lower than the desired delivery temperature of the conditioned air. Accordingly, when the primary air flow is increased in temperature in the reheat heat exchanger 12 there is an elevation of temperature of the primary air flow under conditions of controlled access so that the capacity of the air to retain moisture is increased with a corresponding decrease in relative humidity. It becomes possible, therefore, to realize the attaining of an objective in regard to the relative humidity of the delivered conditioned air without reliance upon excessively large and complicated liquid-gas separating devices. A similar result is achieved in the case of the servo air supply. Here, reducing valve 29 throttles the air flow to the required delivery pressure. In the process the relative humidity of the saturated, cooled air is reduced due to the change in total pressure of the air-water vapor mixture.

As noted, the system may include apparatus and controls playing a part in the efficient use of the air handling system, a disclosure of which seems unnecessary to an understanding of the present invention. Such means might include, for example, automatic controls for the valves 24 and 43, means to limit consumption of bleed air in correspondence with demand, the use of orifice means or the like in duct 14a to insure a desired flow of secondary or servo air and a use of separated water from the devices 15, 21 and 26 to improve cooling performance of the main heat exchanger 10.

A preferred embodiment of the invention, and a preferred method of practicing the invention, has been shown and described. It will be understood, however, that changes and omissions in the form and detail may be made without departing from the spirit and scope of the invention, the limitations of which are only as defined in the claims.

What is claimed is:

1. An air cycle cooling system operating from compressor bleed air or the like, characterized by the use of a water separator and a reheat heat exchanger in directly intercommunicating series relation downstream of the air cycle turbine, said heat exchanger being heated by a direct flow of bleed air in by-passing relation to the air cycle machine, the cooled depressurized air leaving the turbine having excess water removed in said separator and being additionally dried in said reheat heat exchanger with the increase in temperature undergone in said reheat heat exchanger further improving the relative humidity characteristics of the cooled depressurized air.

2. A method of conditioning compressor bleed air or the like for environmental cooling, including the steps of putting bleed air through an air cycle machine lowering the air pressure and reducing the temperature to a value below the temperature at which it is desired to use the air, directing the bleed air leaving the air cycle machine through a separator to remove excess moisture, and beyond the separator reheating the discharging bleed air approximately to the value at which it is to be used under conditions of closed intercommunication precluding absorption of other moisture for a further evaporation of moisture and improved relative humidity characteristics.

3. A method according to claim 2, wherein bleed air is used simultaneously as pressure fluid in servo operations, characterized by the steps of drawing bleed air from in advance of the air cycle machine and directing it in bypassing relation thereto for servo purposes, and flowing the by-passing air in heat transfer relation to the bleed air discharging from the air cycle machine to effect the defined reheating of such air and at the same time to cool the by-passing air.

4. A system for supplying conditioned air to an aircraft or like compartment for cooling or heating purposes and for separately supplying conditioned air for servo purposes, said system being supplied from a source of compressor bleed air or like flow of relatively high temperature high pressure air, including an air cycle machine, a main heat exchanger through one side of which the bleed air is directed prior to entering the turbine part of the air cycle machine, means defining a flow path for ambient air through the other side of said main heat exchanger to the compressor part of the air cycle machine, said compressor part drawing ambient air through said heat exchanger and discharging it to exhaust, said bleed air being cooled in said main heat exchanger and being further cooled and reduced in pressure by passage through the turbine part of the air cycle machine, an exit flow path extending from the air cycle machine for directing a main flow of cooled, reduced pressure bleed air to a place of use, a bleed air by-pass around the air cycle machine directing a lesser flow of partly cooled bleed air for servo purposes, a reheat exchanger disposed in said exit flow path and said by-pass to raise the temperature of the air of said main flow and to further reduce the temperature of the air of said lesser flow, moisture removing means in said exit flow path in advance of said reheat heat exchanger and other moisture removing means in said by-pass beyond the reheat heat exchanger, said moisture removing means reducing the water content of the bleed air for improved relative humidity characteristics thereof, the reheating of the main air flow in said reheat heat exchanger further improving the relative humidity characteristics of the air in the main flow, and pressure reducing means in said by-pass beyond said water removing means therein for expansion of the servo air therebeyond with accompanying further improvement in relative humidity characteristics.

5. A method of conditioning compressor bleed air or the like for environmental cooling and for use as pressure fluid in servo operations, including the steps of putting bleed air through an air cycle machine lowering the air pressure and reducing the temperature to a value below the temperature at which it is desired to use the air, directing the bleed air leaving the air cycle machine through a separator to remove excess moisture, beyond the separator reheating the discharging bleed air approximately to the value at which it is to be used under conditions precluding absorption of other moisture for a further evaporation of moisture and improved relative humidity characteristics, drawing bleed air from in advance of the air cycle machine and directing it in by-passing relation thereto for servo purposes, flowing the by-passing air in heat transfer relation to the bleed air discharging from the air cycle machine to effect the defined reheating of such air and at the same time to cool the by-passing air, directing the by-passing air after flowing in heat transfer relation to the air discharging from the air cycle machine through a moisture eliminator to remove excess moisture, and beyond the moisture eliminator allowing the by-passing bleed air to escape through pressure reducing means for an expansion of the servo bleed air achieving improved relative humidity characteristics.

References Cited
UNITED STATES PATENTS

| | | | |
|---|---|---|---|
| 2,819,590 | 1/1958 | Green | 62—172 |
| 3,045,983 | 7/1962 | Best | 62—172 |
| 2,585,570 | 2/1952 | Messinger | 62—402 |
| 2,721,456 | 10/1955 | Whitney | 62—402 |
| 2,902,836 | 9/1959 | Le May | 62—172 |
| 3,083,546 | 4/1963 | Turek | 62—402 |

WILLIAM J. WYE, Primary Examiner

U.S. Cl. X.R.

62—87, 172, 402, 61